United States Patent Office 3,506,849
Patented Apr. 14, 1970

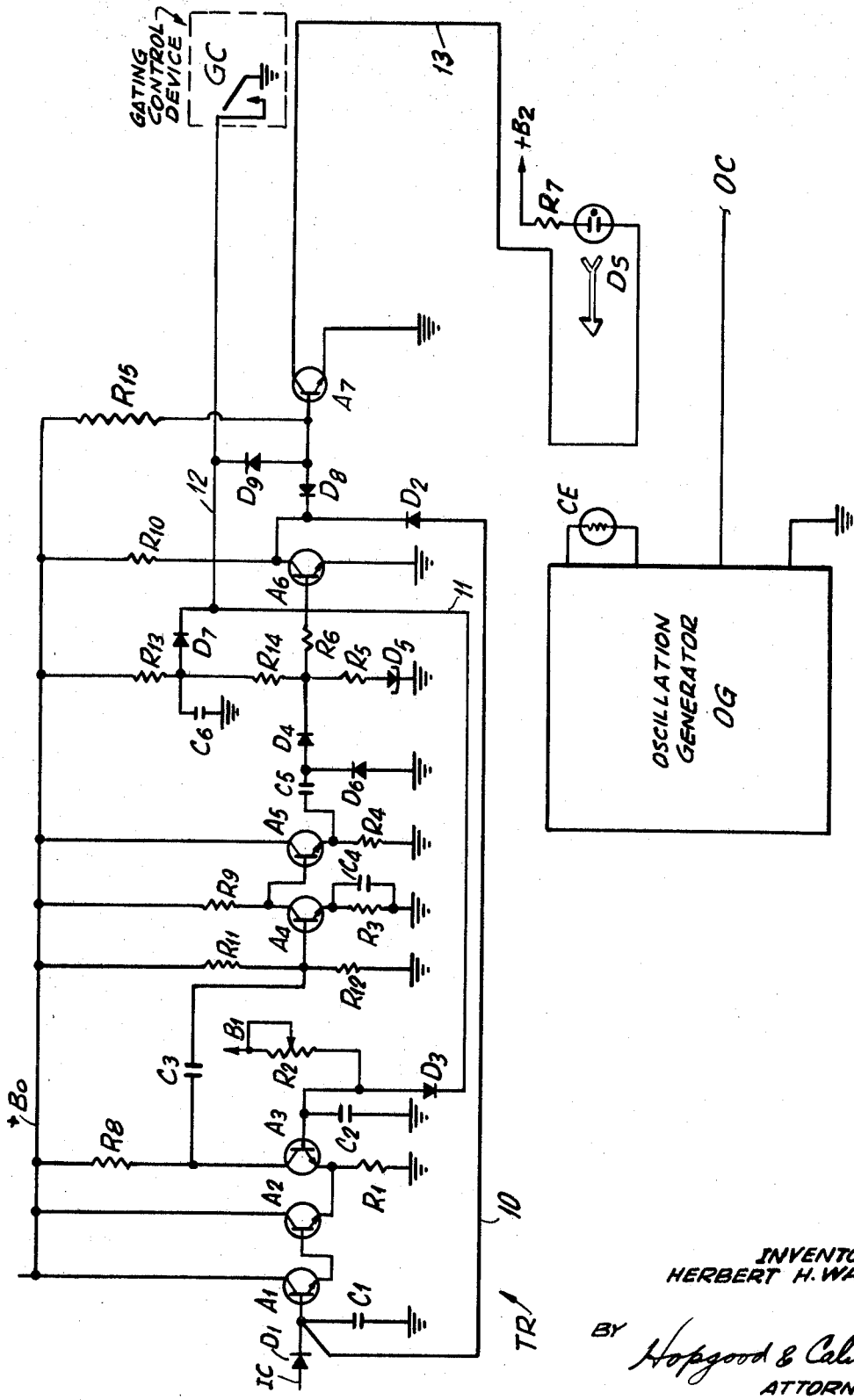

3,506,849
FREQUENCY SHIFT AMPLITUDE TO TIME CONVERTER
Herbert H. Waller, Hicksville, N.Y., assignor to Servo Corporation of America, Hicksville, N.Y., a corporation of New York
Filed Nov. 30, 1966, Ser. No. 597,937
Int. Cl. H03k 5/04
U.S. Cl. 307—235                    8 Claims

ABSTRACT OF THE DISCLOSURE

A frequency shift amplitude to time converter is provided. The converter includes a first circuit connected to a signal input circuit capable of transmitting pulses and including a capacitor for producing a charge thereon of a magnitude corresponding to the amplitude of the input circuit pulses. A second circuit including a second capacitor adapted to receive a charge thereon which increases in magnitude linearly with respect to time is also provided. The second capacitor has a first terminal connected to a power source and a second terminal connected to ground. A gating circuit including a switch element is shunted across the second capacitor thereby preventing its charging when the switch element is closed. A control circuit is interconnected with the first and second circuit and includes a switching transistor adapted to be rendered conductive when the second capacitor is charged to a level corresponding to the charge on the first circuit capacitor. The converter also includes oscillation generator control means interconnected with the gating circuit and a switching transistor adapted to drive an oscillation generator for providing an A.C. voltage of a predetermined frequency for a time period beginning with the opening of the gating circuit switch and lasting until the switching transistor is rendered conductive.

This invention relates generally to pulse communication systems. More particularly, this invention relates to systems for measuring the magnitudes or amplitudes of pulses. Still more particularly, this invention relates to systems for converting applied pulses of varying magnitudes into A.C. pulses of lengths, i.e., time durations, corresponding to the magnitudes or amplitudes of the pulses.

In frequency shift carrier systems employed for the transmission of pulses of varying magnitudes, it is not uncommon for current of a first predetermined frequency to be transmitted in the idle condition of the system when none of the pulses are being transmitted, but when a pulse is being transmitted, current of a second predetermined frequency will be generated and then transmitted for a time interval corresponding to the pulse amplitude. Such a carrier system is uniquely applicable, for example, to railway train operation, where it is frequently necessary to detect the development of heated or over-heated bearings and journal boxes at an early stage. To accomplish such a detecting function, an arrangement has been developed which, in accordance with this invention, will transmit carrier current of one frequency, i.e., frequency $fs$, in its normal or idle state—to indicate that the communication system is in operating condition—but when a pulse generated by and derived from the equipment to be detected is received (such pulse sometimes to be called a "signal pulse"), the signal pulse will trigger the equipment to generate carrier current of a second frequency, i.e., frequency $fm$, and this latter current will be transmitted for a time interval corresponding to the magnitude of the signal pulse. At a remote terminal where the carrier currents are to be received and detected, the carrier current of the second frequency will indicate, by its duration, a signal voltage that, in the example of the railway case, may serve to alert maintenance personnel or, in other cases, may activate other equipment for sounding or exhibiting an alarm.

As the foregoing suggests, this invention involves a communication system for transmitting signal pulses of varying magnitudes by means of carrier currents of correspondingly varying durations and for detecting the magnitudes of the signal pulses from the received carrier currents. The carrier current system, which is of the frequency-shaft type, will serve as the means for transmitting the intermittent or repetitive signal pulses of varying magnitudes between points widely spaced from each other, so that the information conveyed by the carrier currents may be detected and, if desired, reconverted to the original signal pulses.

This invention will be better understood from the following more detailed description when read in connection with the accompanying drawing showing one embodiment of the invention merely for illustration.

Referring to the drawing, the principal components of the invention are as follows: a gating control element GC which, upon closure, initiates a gating interval and triggers the operation of the system; an input circuit IC which receives signal pulses from, for example, a railroad hot box detector system or a business machine system or an alarm system, etc.; a capacitor $C_1$, which is charged to a voltage corresponding to the amplitude of the signal pulse received from the input circuit IC; an oscillation generator OG which generates carrier current of a frequency $fs$ in its idle condition but the current of the oscillation generator OG changes to a frequency $fm$ to transmit carrier current of the latter frequency for a period of time corresponding to the magnitude of the received signal pulse; a capacitor $C_2$ which, upon the opening of the gating control element GC, becomes charged at a linear rate, per a predetermined ramp function, but when the charge on the capacitor substantially equals the voltage on capacitor $C_1$, a circuit will be controlled to enable capacitor $C_1$ to become discharged; a lamp DS which is extinguished during the gating interval, but becomes illuminated at the end of the gating interval and remains illuminated for a period of time corresponding to the magnitude of the signal pulse received from input circuit IC, so that it may control the time during which the carrier current of frequency $fm$ will be generated by the oscillation generator OG; and an output circuit OC over which the carrier currents $fs$ and $fm$ may be transmitted to a distant point by wire or wireless, where such carrier currents may be received and detected and corresponding signal pulses or alarms or both may be produced. The relationship of these principal components to the remainder of the equipment of the invention will become apparent from the subsequent disclosure.

The oscillation generator OG and its operation are described in my copending application filed on or about Nov. 21, 1966, entitled "Oscillation Generator."

The gating control element GC is closed at the beginning of a gating interval to initiate the operation of translator TR, and is opened at the end of the interval. Immediately upon closure of the control element GC, the input circuit IC will receive a signal pulse which is to be detected and measured. This signal pulse will be transmitted through diode $D_1$ to capacitor $C_1$ to charge this capacitor. Capacitor $C_1$ will be charged at a rapid rate to a voltage corresponding to the magnitude of the received signal pulse. None of the charge of capacitor $C_1$ will be leaked through conductor 10 and diode $D_2$, the upper terminal of which has a positive voltage applied thereto to block any such leakage.

Substanitally the same voltage as reached capacitor $C_1$ will reach the resistor $R_1$ through the path of the base and emitter electrodes of transistors $A_1$ and $A_2$. Resistor $R_1$ will therefore hold a charge across its terminals as long as capacitor $C_1$ remains charged. The positive voltage on the upper terminal of resistor $R_1$ will hold switching transistor $A_3$ non-conductive.

It is noted, however, that while condenser $C_1$ is being charged, lamp DS remains extinguished and the oscillation generator OG, which is controlled by lamp DS, will be generating a carrier current of frequency $fs$. This carrier current will be transmitted over output circuit OC to a distant point. At the same time capacitor $C_2$ will remain discharged during the gating interval because its upper terminal is connected to ground through diode $D_3$, conductors 11 and 12, and the gate control element GC. The peak voltage on capacitor $C_1$ will remain substantially constant due to the high impedance of the base of transistor $A_1$.

At the end of the gating interval, the gating control element GC will be opened, disconnecting ground from conductor 12 and from conductor 11 which is connected to capacitor $C_2$ through diode $D_3$. Capacitor $C_2$ will become charged at a substantially linear rate by a ramp current flowing from positive source $B_1$ through resistor $R_2$. At the same time, the lamp DS will be illuminated, as will be explained hereinafter, whereupon the oscillation generator OG will produce and transmit current of frequency $fm$ to the output circuit OC.

When the voltage reaching capacitor $C_2$ upon its charge equals the voltage on resistor $R_1$ (which is substantially the same as the voltage on capacitor $C_1$), the transistor $A_3$ is rendered conductive. The period during which transistor $A_3$ was theretofore non-conductive was proportional to the voltage on resistor $R_1$ (or the voltage capacitor $C_1$). The higher the voltage on resistor $R_1$, the longer the non-conductive state of transistor $A_3$ will be, and conversely, the lower the voltage, the shorter will be the non-conductive state.

The above-noted transition of transistor $A_3$ from non-conductivity to conductivity necessarily generates a pulse at the collector of this transistor. This pulse will be transmitted through the circuit of capacitor $C_3$, the base and emitter electrodes of transistor $A_4$, resistor $R_3$ and condenser $C_4$ in parallel to ground. This pulse, after its amplification by transistor $A_4$, will be transmitted from the collector of transistor $A_4$ through the base and emitter of transistor $A_5$, resistor $R_4$ and ground. The pulse as thus further amplified by transistor $A_5$ will be transmitted over a circuit of capacitor $C_5$, diode $D_4$, resistor $R_5$, tunnel diode $D_5$ and ground. This flow of current to tunnel diode $D_5$ triggers the diode to operate at its higher voltage mode (tunnel diode $D_5$ is normally held in its lower voltage mode) whereupon transistor $A_6$ is rendered conductive. The diode $D_5$ is connected to the base of transistor $A_6$ via resistor $R_6$. Capacitor $C_1$ now discharges at a fast rate over a circuit including conductor 10, diode $D_2$, the collector and emitter of transistor $A_6$, and ground. Diode $D_8$ now clamps transistor $A_7$ to cutoff, thereby extinguishing lamp DS. This returns oscillation generator OG to its frequency $fs$ and current of this frequency is transmitted to the output circuit OC. Capacitor $C_1$ is now ready for the beginning of the next gating interval.

In short, capacitor $C_1$ becomes charged at the beginning of the gating interval while the gating control device GC is closed. Lamp DS will be extinguished at that time and hence the oscillation generator OG will generate carrier current of frequency $fs$. But at the end of the gating interval, the gating control device GC will be opened. Capacitor $C_2$ will start to receive its charge. At the same time lamp DS will be illuminated, causing oscillation generator OG to produce carrier current of frequency $fm$. When the charge on capacitor $C_2$ substantially equals that on capacitor $C_1$, lamp DS will be extinguished and therefore oscillation generator OG will return to produce carrier current of frequency $fs$. The capacitors $C_1$ and $C_2$ will separately discharge. However, the oscillation generator OG will supply current of frequency $fm$ only for a period of time corresponding to the magnitude of the charge applied to capacitor $C_1$.

Thus, lamp DS is normally extinguished. It remains extinguished during the gating interval when the gating control element GC is operated and while capacitor $C_1$ is charged. But lamp DS becomes illuminated at the end of the gating interval (upon the opening of control device GC) but transistor $A_6$ remains cut off. Lamp DS remains illuminated while capacitor $C_2$ is receiving its charge. However, as soon as the voltage on charge of capacitor $C_2$ equals the voltage on charge of capacitor $C_1$, lamp DS becomes extinguished to terminate a time interval which corresponds to the magnitude of the applied signal pulse.

The circuit of lamp DS includes source $B_2$, resistor $R_7$, conductor 13, the collector and emitter electrodes of transistor $A_7$ and ground. The lamp DS remains extinguished while capacitor $C_2$ is discharging its voltage. In fact, it remains extinguished until the end of the next gating interval.

The end of the gating interval, i.e., when the gating control element GC is opened, occurs before the beginning of the next charge of capacitor $C_1$. The discharge of capacitor $C_2$ is the final step in preparing the translator TR for the next gating interval. The discharge circuit of capacitor $C_2$ includes diode $D_3$, conductors 11 and 12, the gate control element GC and ground. The next gating interval can occur only sometime after element GC has been opened, and capacitor $C_2$ is discharged only after element GC is closed.

The collectors of transistors $A_1$, $A_2$, $A_3$, $A_4$, $A_5$ and $A_6$ are connected to a common positive source of voltage $Bo$. The connection to the collector of transistor $A_3$ is made through a resistor $R_8$, to the collector of transistor $A_4$ through resistor $R_9$, to the collector of transistor $A_6$ through resistor $R_{10}$, and to the base of transistor $A_7$ through resistor $R_{15}$. The same source of voltage is connected to the base of transistor $A_4$ by resistor $R_{11}$, the base being grounded by resistor $R_{12}$. The same source is connected to the terminal common to diode $D_4$ and resistor $R_6$ through resistor $R_{13}$ and $R_{14}$.

When the transistor $A_6$ is in a conducting state, the flow of current from source $Bo$ through the collector and emitter of the transistor to ground will prevent the transistor $A_7$ from becoming conductive. Thus, lamp DS will remain extinguished while transistor $A_6$ is conductive.

Resistor $R_3$ and capacitor $C_4$ serve as an emitter bias circuit for transistor $A_4$. Diode $D_6$ provides with resistor $R_4$ a discharge circuit for capacitor $C_5$. Diode $D_7$ removes current from the tunnel diode $D_5$ when gating control element GC is closed and resets the tunnel diode at its low voltage operating point.

The arrangement of this invention is suitable, as already suggested, for railway train operation. When so employed, the gating control element GC will be normally open but will become closed by equipment carried by a train (not shown when such equipment is in the near vicinity of a first device, such as a transducer, mounted fixedly along the tracks. The control element GC becomes opened later when such equipment is brought into the vicinity of another similar device also mounted along the tracks. The spacing between such devices determines the gating interval, but the duration of the interval is also controlled by the speed of the train.

The equipment just mentioned may also include as part of the translator TR a so-called hot box detector (not shown) which includes a bolometer which "looks at" one of the hot boxes or wheel bearings of the train and generates a signal pulse corresponding to the temperature of the hot box or bearing. This signal pulse is transmitted to the input circuit IC. This signal pulse is the one which is measured by the apparatus of this invention.

Naturally, this same equipment may readily be employed for business machine equipments, or alarm systems, etc. One circuit will trigger the control element GC and another circuit will transmit to the input circuit IC a voltage or series of voltages which are to be measured or transmitted. Any voltage amplitude will be converted into an A.C. voltage of a duration which corresponds to the voltage amplitude.

I claim:

1. In combination, a signal input circuit capable of transmitting pulses; a first circuit connected to said input circuit including a first capacitor for providing a charge thereon of a magnitude corresponding to the amplitude of each pulse; a second circuit including a second capacitor adapted to receive a charge thereon which increases in magnitude linearly with respect to time, said second capacitor having a first terminal connected to a power source and a second terminal connected to ground; a gating circuit including a switch element extending between said second capacitor first terminal and ground whereby to prevent the charging of said second capacitor when said switch element is closed; a control circuit interconnected with said first and second circuits, said control circuit including a switching transistor adapted to be rendered conductive when said second capacitor is charged to a level corresponding to the charge of said first capacitor; oscillation generator control means interconnected with said gating circuit and said switching transistor and adapted to drive an oscillation generator for producing AC voltage of a predetermined frequency for a time period beginning with the opening of said gating circuit switch element and lasting until said switching transistor is rendered conductive whereby the duration of said time period corresponds to the magnitude of the charge on said first capacitor; and an oscillation generator.

2. A claim according to claim 1 in which the oscillation generator produces an A.C. voltage of a different frequency at all times when the A.C. voltage of predetermined frequency is not being produced.

3. A claim according to claim 2 in which a frequency control element is connected to the oscillation generator to control the frequency of the oscillation generator in response to the charge in the first circuit.

4. A communication system comprising: an input circuit supplying a series of signal pulses which are variable in magnitude; an oscillation generator which normally generates oscillations of a first predetermined frequency and is capable of generating oscillations of a second predetermined frequency; a light emitter; a circuit including a light-responsive device connected to said oscillation generator for changing its frequency to the second predetermined frequency in response to light emitted from said source; a translatory circuit interconnecting the input circuit to said light emitter to produce illumination in response to each supplied signal pulse, said translatory circuit including a capacitor which is charged to a D.C. voltage corresponding to the magnitude of each supplied signal pulse and including also a circuit for activating the light emitter for a period of time corresponding to the magnitude of the D.C. charge of the capacitor; whereby the oscillation generator will supply current of the second predetermined frequency for intervals each of a duration corresponding to the magnitude of each signal pulse.

5. A claim according to claim 4 in which the translatory cricuit includes a switching transistor coupled to said capacitor and the switching transistor device becomes conductive when the voltage applied to said capacitor reaches a value proportional to the magnitude of the signal pulse.

6. A claim according to claim 5 in which the translatory circuit includes a second capacitor receiving a ramp function charge and the switching transistor device becomes conductive upon the charge applied to the second condenser substantially equalling the charge applied to the first capacitor.

7. Apparatus for converting a series of signal pulses which vary in magnitude into pulses of alternating current of durations corresponding to the magnitude of the respective signal pulses, comprising: first and second capacitors; a first charging circuit responsive to each signal pulse for charging the first capacitor to a voltage corresponding to each signal pulse; a second charging circuit for charging the second capacitor at a constant rate with respect to time; a source of light; an oscillation generator normally operating at a first predetermined frequency and capable of operating at a second predetermined frequency; a light responsive device included in said oscillation generator and responsive to light rays from said source to cause said oscillation generator to produce current of a selected one of the predetermined frequencies only when light rays activate said device; a translatory circuit coupling said first and second capacitors to the source of light, said translatory circuit responding to a charge on the second capacitor to cause said source of light to emit light rays and responding also to the substantial equality of the charges on both capacitors to interrupt the emission of light rays from said source of light; and a load circuit receiving the currents generated by the oscillation generator.

8. A claim according to claim 7 in which the translatory circuit coupling includes a switching transistor responding to the substantial equality of the charges of the two capacitors.

References Cited

UNITED STATES PATENTS

| | | | |
|---|---|---|---|
| 2,824,287 | 2/1958 | Green et al. | 307—265 XR |
| 2,905,868 | 9/1959 | Matkins et al. | 332—14 XR |
| 3,100,285 | 8/1963 | Clynes | 332—14 |
| 3,286,200 | 11/1966 | Foulger | 307—235 XR |
| 3,364,365 | 1/1968 | Eisenhauer | 307—265 XR |
| 3,408,572 | 10/1968 | Wolf et al. | 325—163 |

JOHN S. HEYMAN, Primary Examiner

S. T. KRAWCZEWICZ, Assistant Examiner

U.S. Cl. X.R.

246—169; 307—265; 325—163; 328—151; 332—14